Dec. 13, 1966  A. IRIZARRY  3,291,504
SAFETY DEVICE FOR VEHICLES
Filed Feb. 4, 1965
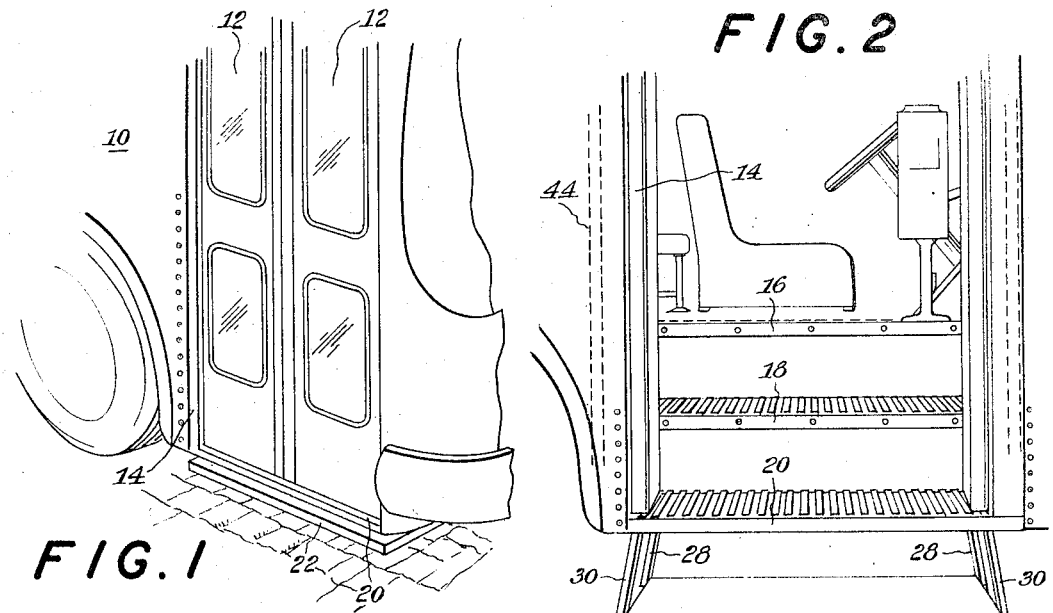
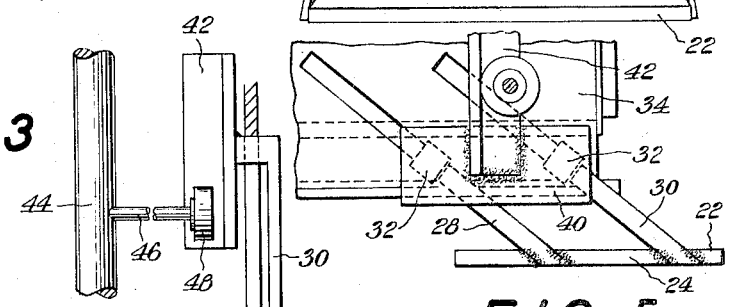
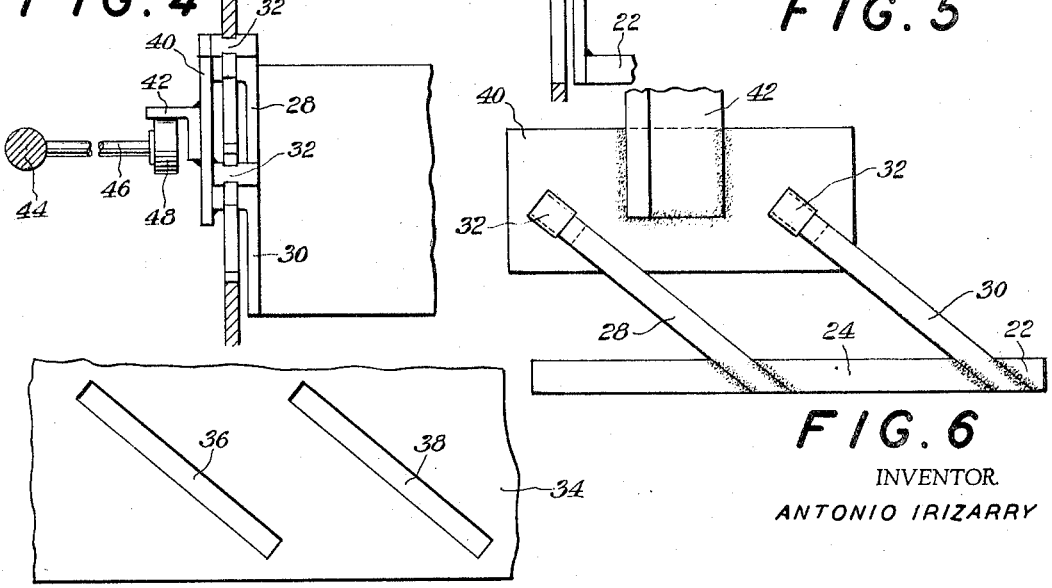
INVENTOR.
ANTONIO IRIZARRY

United States Patent Office 3,291,504
Patented Dec. 13, 1966

3,291,504
SAFETY DEVICE FOR VEHICLES
Antonio Irizarry, New York, N.Y.
(P.O.Box 361, Dover, N.J.)
Filed Feb. 4, 1965, Ser. No. 430,260
2 Claims. (Cl. 280—166)

My invention is directed toward safety devices for use in vehicles such as buses, and more particularly is directed toward a safety step which permits passengers, especially aged and infirm passengers, to make safer and easier use of the steps of the vehicle when entering or leaving same.

Accordingly, it is an object of my invention to provide a new and improved safety device of the character indicated.

Another object is to provide a new and improved safety step which can be easily secured to or removed from an existing vehicle.

Yet another object is to provide a new and improved safety device of the character indicated which can be easily manufactured at low cost.

All of the foregoing and still further objects and advantages of my invention will now be explained with reference both to this specification and to the drawings wherein:

FIG. 1 is a perspective view of a door and door frame of a typical vehicle such as a bus incorporating my invention;

FIG. 2 is a front view of the door and door frame with the door open;

FIG. 3 is a detail side view of the mechanism for raising and lowering my safety device;

FIG. 4 is a top view of the mechanism shown in FIG. 3;

FIG. 5 is a side view of my safety device;

FIG. 6 is a side view of a portion of the structure shown in FIG. 5; and

FIG. 7 is a side view of another portion of the structure shown in FIG. 5.

Referring now to FIGS. 1–7, there is shown a bus identified generally at 10 and having a door 12 (formed from two vertical half sections) mounted in a door frame 14. Mounted in the door frame is a plurality of steps having a plurality of horizontal vertically spaced treads 16, 18 and 20.

A horizontal plate 22 is secured to the bottom of tread 20 and is actuated in such manner that when the door of the bus is closed, the plate 22 is raised and held against the bottom of tread 20. When the door is opened, plate 22 is released and falls outward and downward to ground level for use by passengers as previously indicated. The plate 22 always remains in horizontal position. Hence aged or infirm passengers will always have a firm bottom tread at ground level for use.

The plate 22 has opposite ends 24 and 26. First and second vertically inclined arms 28 and 30 are each secured at one end to each of ends 24 and 26. These arms 28 and 30 are parallel.

Each of these inclined arms has an element 32 slidably engaging a slot. More particularly, a vertical plate 34 is secured adjacent each end of tread 20. Each vertical plate 34 carries first and second vertically inclined parallel slots 36 and 38 whereby there is a slot corresponding to each inclined arm. Element 32 of each arm slidably engages the corresponding slot. The cooperation of the arms and slots insures that plate 22 is held horizontally at all times.

A horizontal connecting arm 40 is secured to each pair of first and second inclined arms 28 and 30. Each arm 40 has an upwardly extending vertical extension 42.

To raise plate 22, the driver of the bus closes a switch which causes a vertical rod 44 mounted within the frame to rotate about its own axis. A horizontal shaft 46 is secured at one end to rod 44 whereby shaft 46 is rotated horizontally about the secured end as rod 44 rotates. When shaft 46 is so rotated, wheel bearing 48 on the other end of shaft 46 bears against extension 42 and thus causes a lifting force to be exerted against plate 22. When the driver opens the switch, rod 44 rotates in an opposite direction, bearing 48 moves away from extension 42, and plate 22 falls by gravity as described.

It is to be noted that, when the device is actuated, the plate is not driven, but is merely permitted to drop by gravity. Thus, in the event that the plate strikes a curb or abutment before reaching its lowest level relative to the vehicle, the operating mechanism will not be damaged by its continued actuation.

While I have described my invention with particular reference to the drawings, my protection is to be limited only by the terms of the claims which follow.

Having thus described my invention, I claim as new and desire to secure by Letters Patent:

1. A safety device for a vehicle having a door frame with steps at the bottom of the frame, said steps including a plurality of horizontal treads, said device comprising a horizontal plate, first means to secure said plate from the bottom of the lowest of said treads in such manner that said plate always remains in horizontal position, said first means including first and second vertical members positioned at opposite ends of said plate, each member having first and second parallel inclined slots, first and second inclined arms secured at each of said opposite ends of the plate and each being associated with a corresponding slot, each inclined arm having an element slidably connecting said each inclined arm to the corresponding slot and first and second horizontally connecting arms, each connecting arm being joined between the corresponding pair of inclined arms and having an upward vertical extension and second means which, when actuated, raises said plate to a position immediately below said lowest tread, said second means when deactuated permitting said plate to fall by gravity to ground level, said second means including a horizontal shaft rotatable about one end thereof in a horizontal plane, the other end of said shaft bearing against one of said extensions when said second means is actuated to cause said plate to be raised, and third means coupled to said second means to actuate said second means under the manual control of the operator of the vehicle.

2. A device as set forth in claim 1 wherein said second means includes a vertical shaft rotatable about its own axis and secured to said one end of the horizontal shaft.

References Cited by the Examiner

UNITED STATES PATENTS

| 1,072,325 | 9/1913 | Gardner | 105—449 X |
| 1,146,559 | 7/1915 | Fuller. | |
| 1,507,792 | 9/1924 | Perkins | 105—449 |
| 1,618,386 | 2/1927 | Poole | 105—449 X |

MILTON BUCHLER, *Primary Examiner.*

BENJAMIN HERSH, *Examiner.*

M. S. SALES, *Assistant Examiner.*